US006995682B1

(12) United States Patent
Chen et al.

(10) Patent No.: US 6,995,682 B1
(45) Date of Patent: Feb. 7, 2006

(54) WIRELESS REMOTE CONTROL FOR A WINCH

(75) Inventors: Charles C. H. Chen, Taipei (TW); Jimmy D. Reimer, McAlester, OK (US)

(73) Assignee: Ramsey Winch Company, Tulsa, OK (US)

( * ) Notice: Subject to any disclaimer, the term of this patent is extended or adjusted under 35 U.S.C. 154(b) by 682 days.

(21) Appl. No.: 10/004,074

(22) Filed: Oct. 30, 2001

Related U.S. Application Data

(60) Provisional application No. 60/244,310, filed on Oct. 30, 2000.

(51) Int. Cl.
*H04Q 1/00* (2006.01)

(52) U.S. Cl. ............................ 340/825.72; 340/825.69

(58) Field of Classification Search ........... 340/825.69, 340/825.72, 825, 825.21; 341/176, 20; 318/16, 318/799; 343/713, 700 MS; 254/323, 264, 254/387; 280/414.1; 180/7.5; 398/106, 398/110; 212/94, 97; 361/161; 370/479
See application file for complete search history.

(56) References Cited

U.S. PATENT DOCUMENTS 3,362,687 A * 1/1968 Hensley ...................... 254/367
3,699,578 A * 10/1972 Fiorentino .................. 361/161
3,732,570 A * 5/1973 Fiorentino .................. 340/825
3,774,217 A * 11/1973 Bonner et al. ......... 340/825.21
3,793,636 A * 2/1974 Clark et al. ................. 370/479
3,906,348 A * 9/1975 Willmott ............... 340/825.63
3,906,369 A * 9/1975 Pitman et al. ................ 341/20
4,313,227 A * 1/1982 Eder .......................... 398/106
4,621,375 A * 11/1986 Simnovec ................... 398/110
5,047,773 A * 9/1991 Seitsonen et al. ........... 341/176
5,072,962 A 12/1991 Webb ........................ 28/414.1
5,349,148 A 9/1994 Hung
5,522,582 A 6/1996 Dilks ......................... 254/323
5,548,198 A * 8/1996 Backstrand ................. 318/799
5,628,583 A 5/1997 Gibson .......................... 405/3
5,663,541 A 9/1997 Mc Gregor, II
5,692,735 A * 12/1997 Aho et al. .................. 254/323
5,868,514 A 2/1999 Gibson .......................... 403/3
6,035,465 A 3/2000 Rogozinski ................... 5/83.1
6,359,589 B1 * 3/2002 Bae ..................... 343/700 MS

OTHER PUBLICATIONS

Cover of 1994 Wam Catalog, All Adventures Lead Through Rough Terrain, Wam Has The Gear to Get You There, Dated 1994, 2 pgs.
MileMarker Hydraulic Winches Internet Web Site: MileMaker Catalog, Printed Oct. 23, 2001, 11 pgs.
Tri Tec Innovations Internet Web Site: Welcome to Tri Tec Innovations, Printed Oct. 23, 2001, 9 pgs.
Lodar Wire-Less Solutions Internet Web Site: Welcome to Lodar Wire-Less Solutions, Printed Oct. 23, 2001, 8 pgs.

* cited by examiner

*Primary Examiner*—Edwin C. Holloway, III
(74) *Attorney, Agent, or Firm*—Roger N. Chauza; Chauza & Handley, LLP

(57) ABSTRACT

A wireless winch control system having a wireless remote transmitter for transmitting AM/PWM modulated signals. A processor in the wireless remote transmitter periodically transmits control signals while a forward or reverse button remains pushed. Once the button is released, a Stop command is automatically transmitted to the receiver. A receiver mounted for control of the winch receives the signals, demodulates the same and controls the winch motor in a reliable manner.

21 Claims, 7 Drawing Sheets

WIRELESS REMOTE CONTROL FOR A WINCH

RELATED APPLICATION

This non-provisional patent application claims the benefit of pending U.S. provisional patent application identified as application No. 60/244,310, filed Oct. 30, 2000, and having the same title.

TECHNICAL FIELD OF THE INVENTION

The present invention relates in general to wireless motor controls, and more particularly to wireless remote control techniques for controlling motorized winches, and the like.

BACKGROUND OF THE INVENTION

The utilization of wireless control systems avoids the problems and annoyances of installing wires to carry the control signals, as well as being limited to the immediate area of usage. Wireless remote control systems have been employed in a variety of different applications, including garage door openers, television and VCR controls, keyless door entry systems for automobiles, etc. Depending upon the application involved, the sophistication of the wireless remote control is varied, thus providing the degree of protection required. In other words, in those applications where safety is not of a great concern, and moderate reliability is acceptable, the circuits, technology and transmission protocol utilized in the remote control can be made to be very cost effective. In other situations, it can be realized that more sophisticated, and thus more costly remote controls may require complicated and expensive circuits and equipment.

The security of remote control devices has been enhanced by the utilization of encoded signals transmitted from the transmitter to the receiver. Digital codes have been a popular method of providing encoded signals so that each wireless remote transmitter operates with only a single receiver. With this arrangement, security is provided so that one transmitter cannot operate multiple receivers within which the security code has not been programmed.

From the foregoing, it can be seen that a need exists for a reliable and cost effective remote wireless system. Another need exists for a remote wireless system for use with winches to provide reliable operation in motorized environments. Yet another need exists for a remote wireless system for use with winches mounted to vehicles.

SUMMARY OF THE INVENTION

In accordance with the principles and concepts of the invention, the disclosed wireless remote control system overcomes the disadvantages and the problems attendant with the prior art devices. In accordance with the described embodiment of the invention, a remote control unit communicates digital codes with a receiver by way of amplitude and pulse width modulated (AM/PWM) signals. In the preferred embodiment of the invention, the wireless remote control system is utilized to control a vehicle-mounted winch. The wireless remote transmitter is configured to control the winch in one direction by holding down a button, so that signals are intermittently transmitted to the receiver for controlling the winch in such direction. In the opposite direction, another button of the remote control is pressed to transmit periodic signals for controlling operation of the winch in the other direction. When either button is released, the transmitter automatically transmits a Stop signal for interrupting operation of the winch. An On/Off button of the wireless remote control unit allows the wireless remote transmitter to be made operational and non-operational to thereby conserve battery power of the wireless remote transmitter. Morever, if the wireless remote transmitter is placed in the "On" mode and no signals are transmitted within a predefined period of time, the transmitter circuits are automatically turned off.

In accordance with another feature of the invention, a horizontally-polarized antenna is mounted high on the vehicle, and coupled to a receiver. The antenna constitutes a metallic foil material adhered to the plastic body or other structure of the vehicle, and is coupled to the receiver by way of a coaxial cable. The coupling between the wireless remote transmitter and the receive antenna avoids dead spots of operation and otherwise intermittent operation which is attendant with the prior art remote control devices.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same parts, functions or elements throughout the views, and in which.

DETAILED DESCRIPTION OF THE INVENTION

Figure 1:
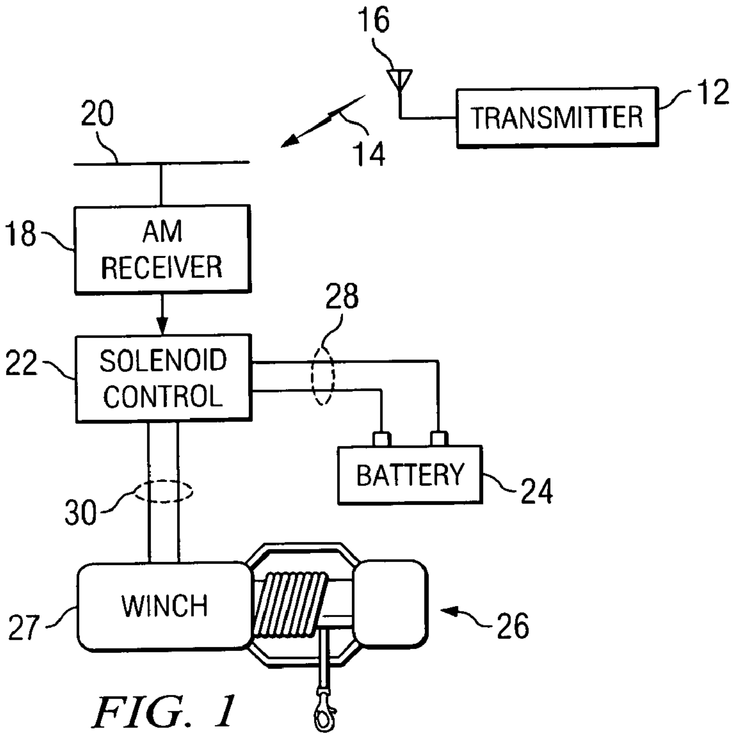
FIG. 1 is a block diagram illustrating the basic functional elements of the invention.

With reference to FIG. 1 there is illustrated the basic functional blocks of the wireless remote control system according to the invention. The system includes a wireless remote transmitter 12 transmitting a signal 14 by way of an antenna 16. While not shown, the antenna 16 is internal to the housing of the wireless remote transmitter 12. For cost effectiveness, the digital encoded commands 14 are transmitted using a hybrid modulation method with both AM and PWM, to thereby reduce the number and complexity of the components of both the wireless remote transmitter 12 and a remotely-located receiver 18. The receiver 18 is coupled to a horizontally-polarized antenna 20. The antenna 20 is tuned to the frequency transmitted by the wireless remote transmitter 12. In the preferred form of the invention the carrier frequency utilized between the wireless remote transmitter 12 and the receiver 18 is 434 MHz. The manner in which coded signals are transmitted from the wireless remote transmitter 12 to the receiver 18 to provide a high degree of reliability is described in more detail below.

The receiver 18 is connected to the antenna 20 for receiving the transmitted signals, and for decoding the same to couple corresponding control signals to a solenoid module 22. The solenoid module is powered by a vehicle battery 24. The solenoid module 22 includes winding and corresponding heavy-duty contacts for coupling power from the battery 24 to the winch 26. Heavy-duty cables 28 couple the battery 24 to the solenoid module 22, and corresponding heavy-duty cables 30 couple the solenoid module 22 to the winch 26. By the utilization of coded signals, the wireless remote transmitter 12 can be turned on, or off, by the operator and can be controlled so as to operate the winch 26 in one direction, or the other direction in a reliable manner.

Figure 2:
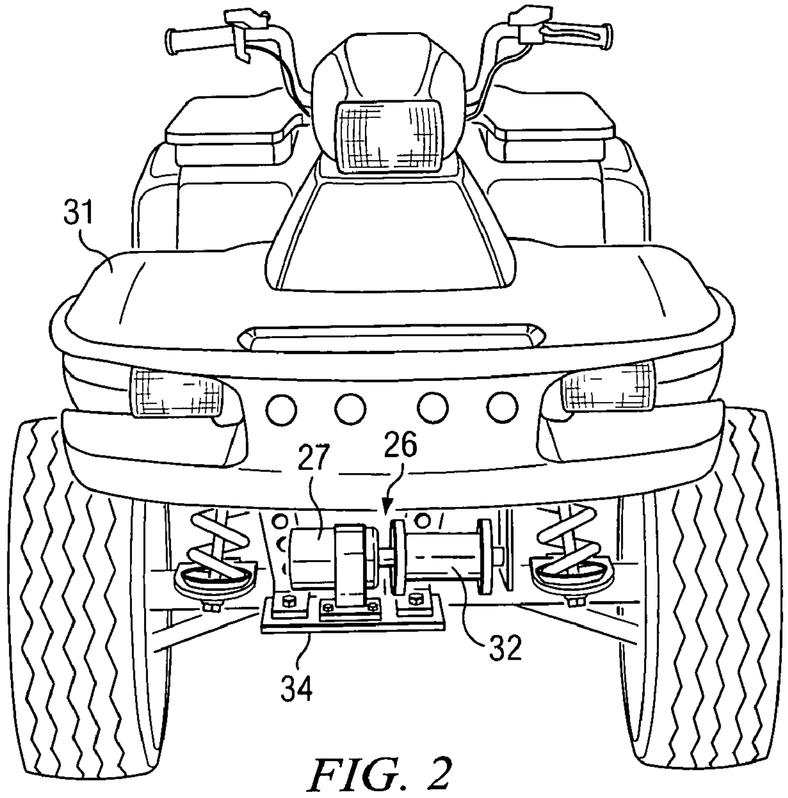
FIG. 2 is a photograph illustrating the location where the winch is mounted on an all terrain vehicle (ATV)

With reference to FIG. 2, there is illustrated a frontal view of an all terrain vehicle (ATV) equipped with a front-mounted winch 26. The winch 26 is of conventional design having a permanent magnet motor 27 for rotating in one direction a reel 32 to which a cable (not shown) is fastened. The direction of the DC current through the motor 27 determines whether the cable reel 32 will be rotated in a clockwise or counterclockwise manner. The winch 26 is bolted to a bottom bracket 34 which, in turn, is bolted to the frame of the ATV 31. The winch 26 can be advantageously utilized to pull the ATV 31 out of mud, streams, or other obstructions which may trap the ATV 31. In addition, the winch 26 can be utilized to pull logs or brush to form clearings, as well as to winch carcasses of animals out of thickets and underbrush. Many other uses can be envisioned by those skilled in the art. It can be appreciated that when used in this environment, a remote wireless control for the winch 26 is highly useful.

Figure 3:
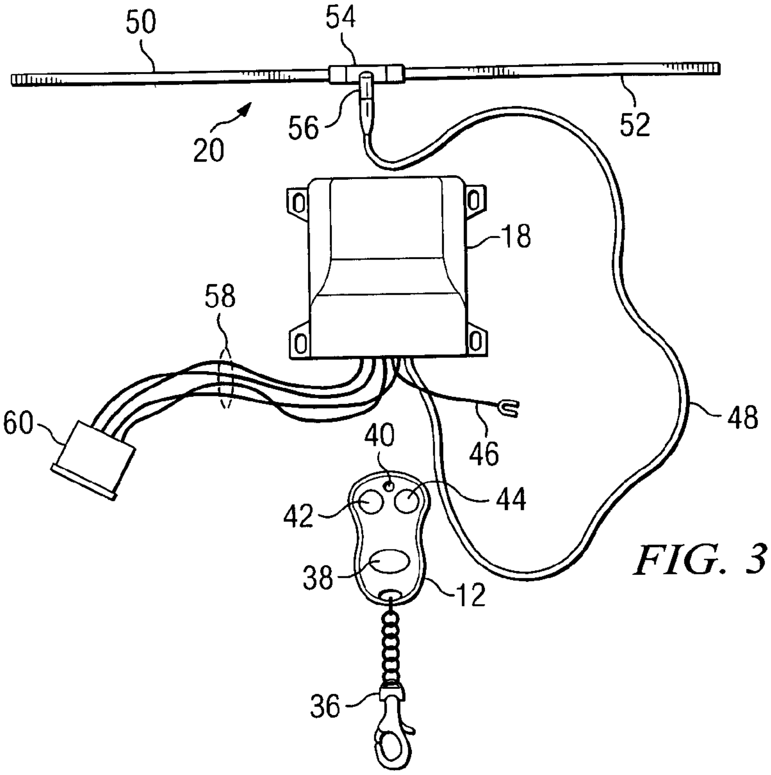
FIG. 3 is a photograph showing the principal functional components of the wireless winch control system.

FIG. 3 illustrates the major components of the wireless winch control system of the invention. Shown as reference numeral 12 is the wireless remote transmitter, attached to a key chain 36. The wireless remote transmitter 12 includes an On/Off button 38 for controlling the off or on mode of operation of the wireless remote transmitter 12. The on/off operation of the wireless remote transmitter 12 is carried out in the following manner. When the On/Off button 38 is pushed for a sufficient period of time and an LED 40 blinks once, the wireless remote transmitter 12 is placed in the on or operational mode. When the On/Off button 38 is held down for a sufficient period of time until the LED 40 blinks twice, the wireless remote transmitter 12 is placed in the power off or sleep mode. One power control button thus controls both modes of operation. Importantly, if the wireless remote transmitter 12 is in the power on mode, and has not been utilized for a predefined period of time, such as twenty minutes, the wireless remote transmitter 12 automatically enters the power off mode to conserve the battery power of the hand held unit.

The wireless remote transmitter 12 further includes an "In" button 42 and an "Out" button 44. When the In button 42 is pressed and held down, a signal is transmitted via an antenna internal to the wireless remote transmitter 12 to start the DC motor 27 of the winch 26. The wireless remote transmitter 12 will transmit the start signal for about 45 milliseconds (ms) and then will interrupt transmission for 54 ms during the first 1.5 seconds after the In button 42 remains depressed. Thereafter, the start signal will again be transmitted for a period of 45 ms, and then will be off for a period of one 54 ms for the remainder of the time when the In button 42 remains depressed. When the In button 42 is released, a Stop command is automatically transmitted to interrupt current through the motor 27 of the winch 26. The Stop command will be transmitted for about 1.5 second after either the In button 42 or the Out button 44 is released. For purposes of safety, no button depression is required to stop rotation of the winch reel 32, only the release of the In button 42. Hence, if the wireless remote transmitter 12 is inadvertently dropped, the motor of the winch 26 will stop since the In button 42 is not depressed. Also, if no valid signal is received from the wireless remote transmitter 12 within two seconds, the receiver 18 will cause the motor 27 of the winch 26 to stop.

The wireless remote transmitter 12 further includes the Out button 44 which causes the motor 27 of the winch 26 to rotate in an opposite direction. As will be described more fully below, the In button 42 causes the reel 32 of the winch 26 to be rotated in a direction so as to wind the cable on the reel 32. The Out button 44, when depressed, causes the reel 32 of the winch 26 to rotate in an opposite direction to thereby allow the cable to be extended from the wench 26. The Out button 24 transmits an out signal according to the same time constraints as set forth above in connection with the In button 42. However, a different code is transmitted by the wireless remote transmitter 12, depending on whether the In button 42 or the Out button 44 is depressed. If both buttons are depressed, no signal is transmitted from the wireless remote transmitter 12. Moreover, when either the In button 42 or Out button 44 is depressed, a security code is transmitted which, when matched by the receiver 18, allows operation of the winch 26. This prevents unauthorized operation of the winch 26.

The intermittent transmission of the In and Out signals by the wireless remote transmitter 12, even when the respective In button 42 or the Out button 44 is depressed, reduces the likelihood that the winch motor and other external electrical noise or interference will interfere with the transmitted signal. In addition, the pulsed operation of the wireless remote transmitter 12 reduces the drain on the small battery contained within the wireless remote transmitter 12.

With reference yet to FIG. 3, there is illustrated the wireless AM receiver 18 encapsulated or otherwise packaged for mounting to a bracket or frame of the vehicle. The receiver 18 is equipped with a ground wire 46 for grounding to the electrical circuit of the vehicle. Connected to the wireless receiver 18 is a coaxial cable 48 extended to the antenna 20. The details of the antenna 20 are set forth in more detail below.

The components of the receive antenna 20 include two copper foil strips 50 and 52, the ends of which are fastened to a plastic bracket 54. The sides of the antenna foils 50 and 52 are covered with an adhesive for bonding to a dielectric or nonconductive portion of the vehicle. The antenna mounting bracket 54 also includes adhesive on the backside thereof for adhering to the dielectric vehicle surface. A phonograph plug 56 and corresponding socket mate the coaxial cable 48 to the adapter 54 for connecting the conductors of the coaxial cable 48 to the antenna foil strips 50 and 52.

The wireless receiver 18 is equipped with four wires 58 terminated by a connector 60 which is coupled to a pair of solenoids for directing current through the motor of the winch 26 in one direction, or the opposite direction, to provide corresponding clockwise and counterclockwise rotation of the cable reel 32. Essentially, when the In button 42 of the wireless remote transmitter 12 is pressed, the receiver 18 causes one solenoid to operate to thereby connect the battery in such a manner as to cause current to flow in the windings of the motor 27 of the winch 26 in one direction. When the Out button 44 of the wireless remote transmitter 12 is pressed, the receiver 18 receives the signal and causes the other solenoid to operate to thereby cause current to flow in the motor 27 of the winch 26 in an opposite direction.

Figure 4:
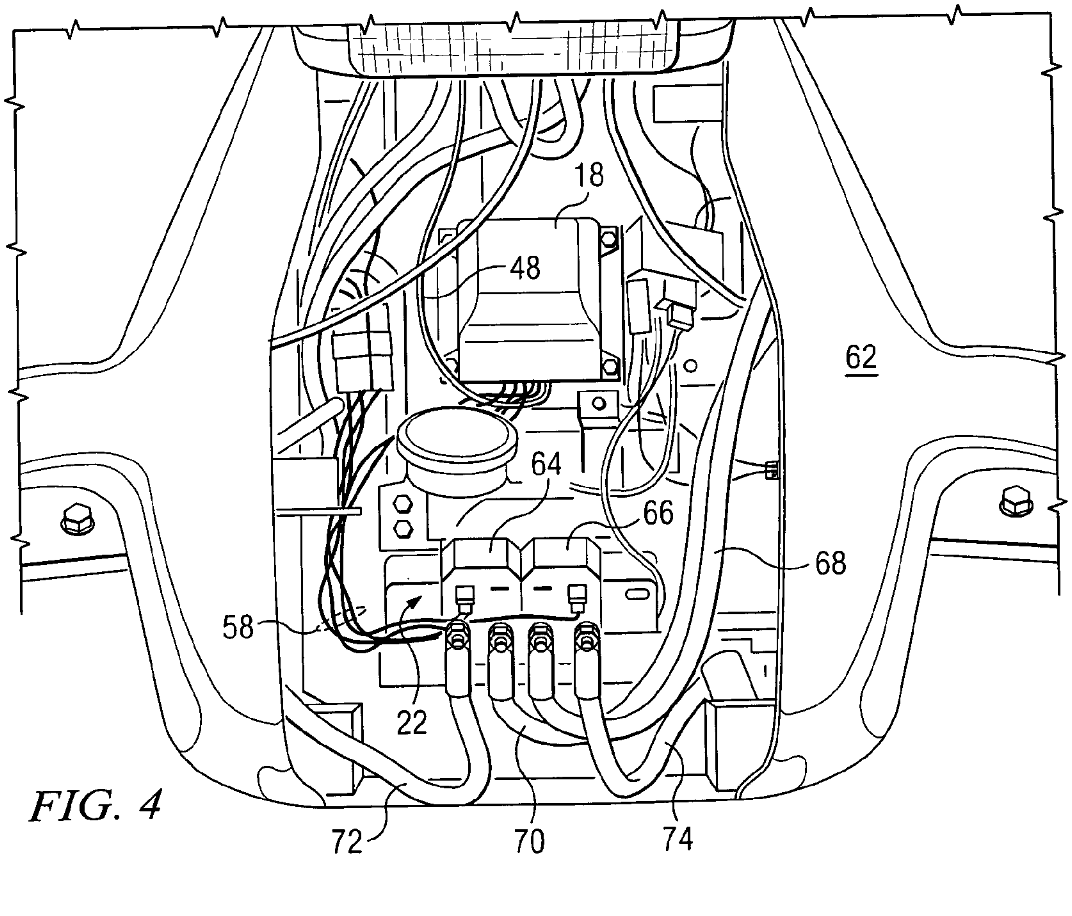
FIG. 4 is a photograph showing an ATV with an access cover removed to illustrate the placement of the various components of the receiver and control modules of the wireless control system.
Figure 5:
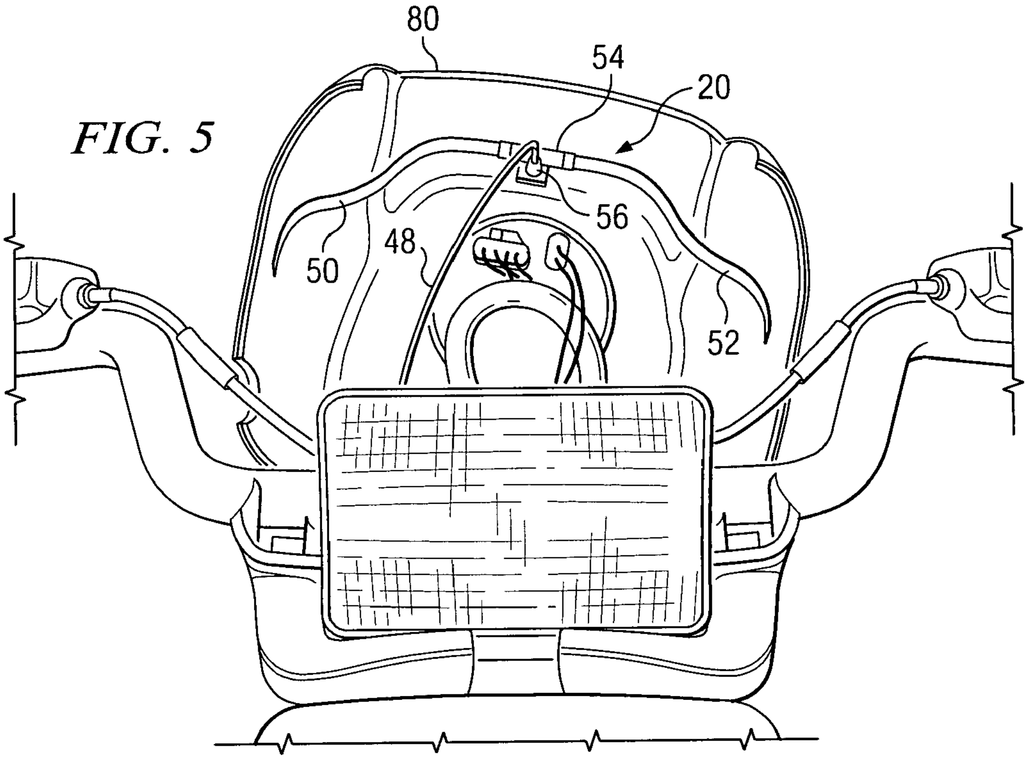
FIG. 5 is a photograph of a portion of the ATV with the head light cover removed to show a attachment of the antenna on the underside of the headlight cover.

With reference now to FIGS. 4 and 5, there is illustrated the installation in the ATV 31 of the components shown in FIG. 3. The wireless receiver 18 is fastened by way of a bracket, or otherwise, within the housing 62. The solenoid module 22 includes a first solenoid 64 and a second solenoid 66. Each solenoid is coupled to the battery 24 by way of a power cable 68 and a ground cable 70. A first cable 72 is coupled from the first solenoid 64 to the motor 27, and a second cable 74 is coupled from the second solenoid 66 to the motor 27. The solenoids 64 and 66 are operated by switches in the receiver 18 for operating to couple battery current in one direction, or the other, to the DC motor 27 of the winch 26. The windings of the solenoids 64 and 66 are coupled by the four wires 58 to the wireless receiver 18.

With reference specifically to FIG. 5, there is illustrated the antenna 20 as mounted within a headlight cover 80 of the ATV 31. The headlight cover 80 affords an environmentally protected space for mounting the somewhat delicate antenna 20. The antenna 20 is bonded by an adhesive to the underside of the headlight cover 80, so as to be disposed in a generally horizontal position. This provides a horizontally polarized antenna for improving the reception of the electromagnetic signals transmitted from the wireless remote transmitter 12. As noted above, the antenna mounting bracket 54 is also adhered to the headlight cover 80 so as to be anchored thereto. While not shown, the coaxial cable 48 can be additionally anchored so that vibrations caused by the general rugged movement of the vehicle do not separate the antenna 20 from the headlight cover 80. The coaxial cable 48 can additionally be anchored, such as by a tie wrap, to the undersurface of the headlight cover 80.

Figure 6:
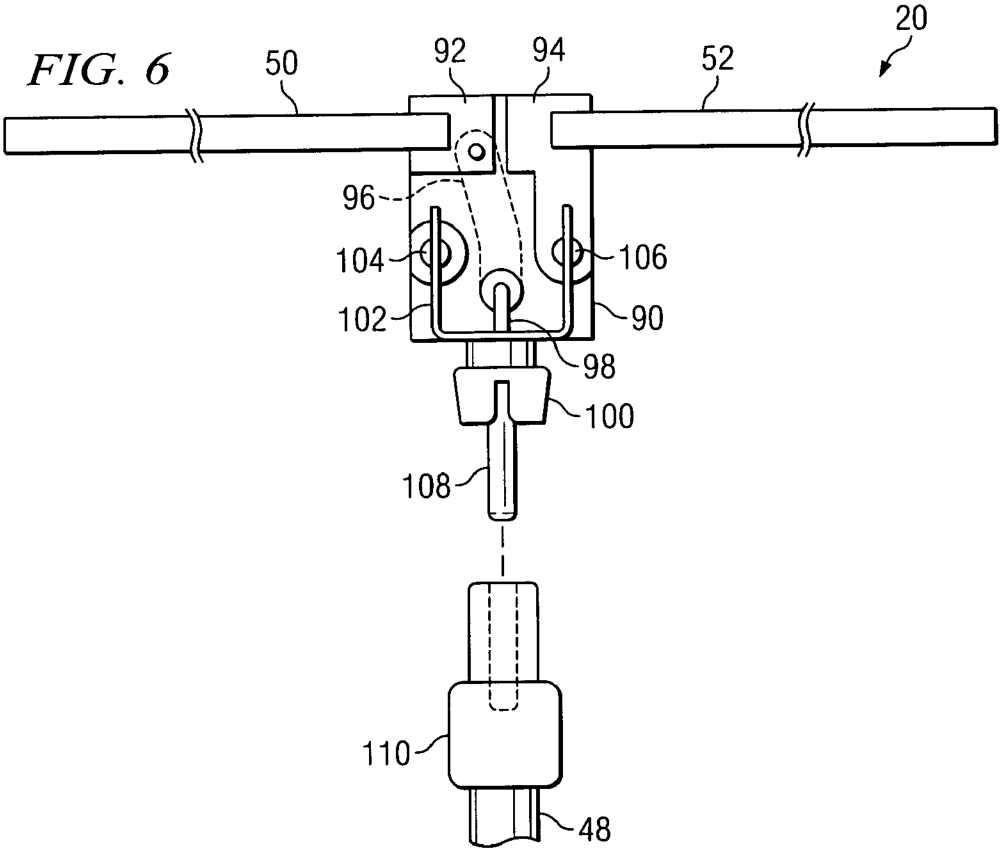
FIG. 6 diagrammatically shows the assembly of the receiver antenna and associated components.

With reference now to FIG. 6, there is illustrated the details of the receiver antenna 20, constructed in accordance with the invention. The antenna 20 of the receiver 18 includes a first copper foil strip 50 and a second copper foil strip 52, each tuned to the half wavelength of the frequency of 434 MHz. Each antenna foil strip 50 and 52 is about 6.72 inches in length. Moreover, each antenna foil strip 50 and 52 is thus fastened to a circuit board 90. In particular, a first metallized area 92 of the circuit board 90 is electrically connected to the antenna foil strip 50. A second metallized area 94 of the circuit board 90 is electrically connected to the second antenna foil strip 52. The antenna foil strips 50 and 52 are connected to the respective areas 92 and 94 by means of a conductive adhesive. The printed circuit board 90 has metallized areas on both sides thereof, and with three plated-through holes. A metallized area 96 formed on the back side of the printed circuit board 90 is connected by way of a plated-through hole to a center conductor 98 of a phonoplug 100. The outer portion of the phonoplug 100 is connected to a U-shaped conductor 102. The outer portion of the phonoplug 100 is thus connected to one plated-through hole 104, and to a second plated through hole 106, the latter of which is connected to metallized area 94. With this arrangement, the center conductor 108 of the phonoplug 100 is connected to the first antenna foil strip 50, and the outer portion of the phonoplug 100 is connected to the other antenna foil strip 52. The coaxial cable 48 for the receiver antenna 20 is coupled to a phonojack 110 that can be electrically coupled to the phonoplug 100 in a conventional manner. The center conductor (not shown) of the coaxial cable 48 is thus connected to the first antenna foil strip 50, and the braided sheath portion of the coaxial cable 48 is connected to the other antenna foil strip 52.

Figure 7B:
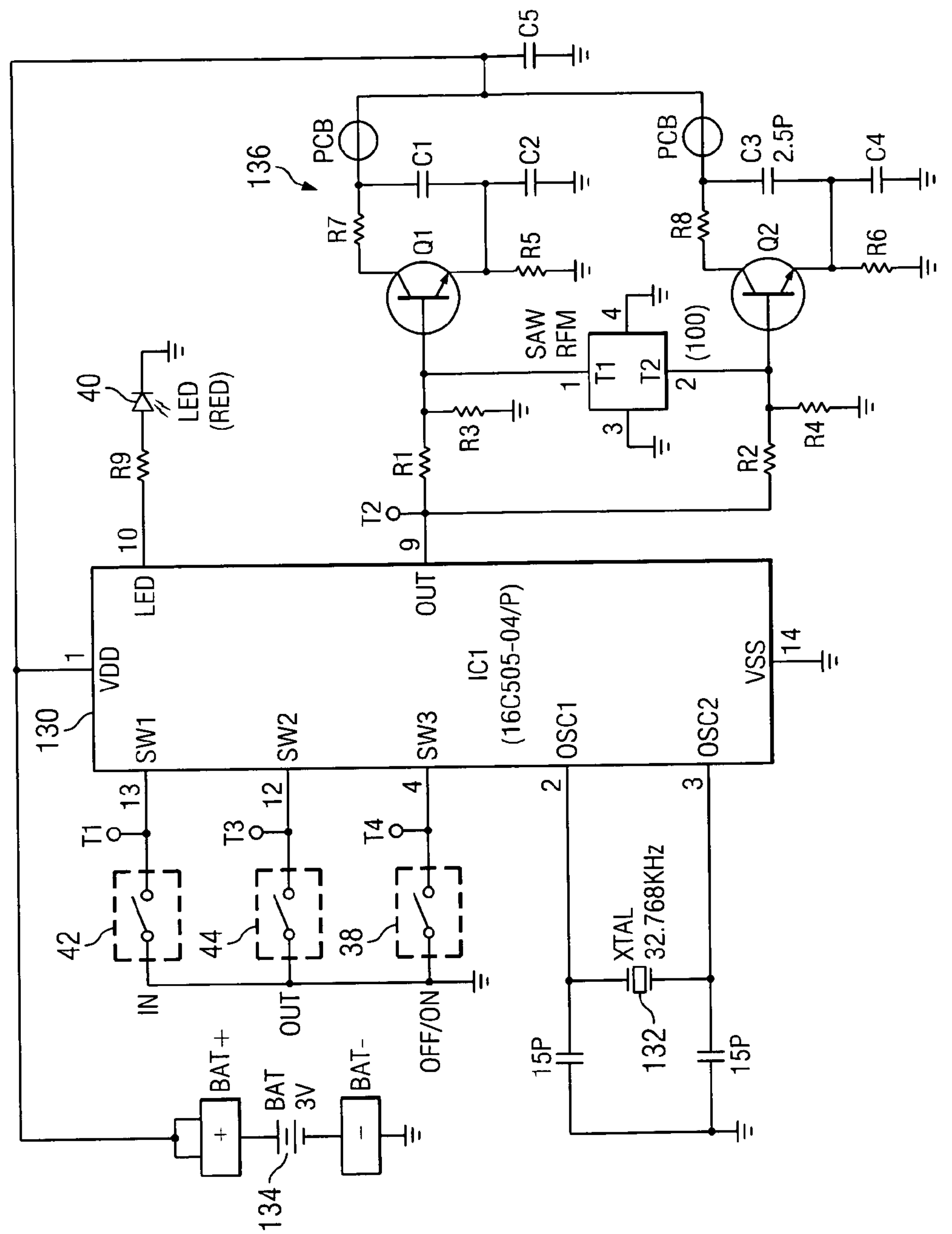
FIG. 7*b* is an electrical schematic diagram of the wireless remote transmitter.
Figure 7A:
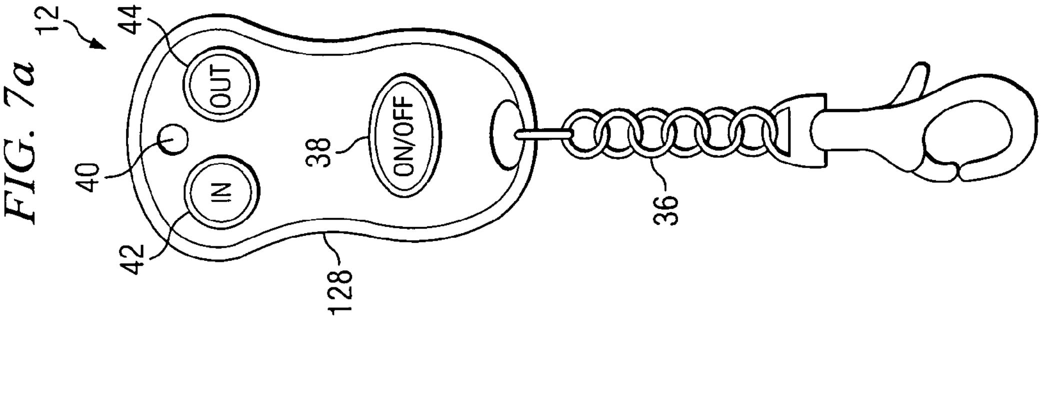
FIG. 7*a* is a top view of the wireless remote transmitter and the identification of the various push button switches.

Reference is now made to FIG. 7*a* where there is illustrated the wireless remote transmitter 12 constructed according to the invention. The antenna 16 is internal to the wireless remote transmitter 12, and thus is not shown in FIG. 7*a*. The wireless remote transmitter includes an On/Off button 38. In addition, the wireless remote transmitter 12 includes an "In" button 42 and a "Out" button 44. Lastly, the wireless remote transmitter 12 includes a visual indicator such as a light emitting diode (LED) 40. The components internal to the wireless remote transmitter 12, which include a printed circuit board, a transmitting antenna and numerous other components, are contained within a housing 128 that is generally moisture proof.

FIG. 7*b* is an electrical diagram of the wireless remote transmitter 12 shown in physical form in FIG. 7*a*. The wireless remote transmitter 12 includes a microprocessor chip 130 to which the switches 38, 42 and 44 are provided as inputs. A crystal 132 and support circuits provide an oscillator signal to the input of the microprocessor 130. A battery 134 provides DC power to the wireless remote transmitter 12. Connected to the output of the microprocessor 130 is the LED indicator 40. An oscillator 136 provides a transmit frequency of 434.00 MHz, defining a carrier frequency on which digital command signals are modulated by both AM and PWM techniques. The microprocessor 130 is programmed to carry out the wireless remote transmitter functions according to the following algorithm.

In order to activate or deactivate the wireless remote transmitter 12, the On/Off button 38 is pressed for a period of at least two-seconds. After the two-second period in which the switch 38 is activated, the transmitter circuit will be turned on if it was previously off (LED will blink once), and will be turned off if it was previously on (LED will blink twice). In the Off mode, the microprocessor 130 is placed in a sleep mode. As noted above, the microprocessor 130 is programmed so that if no button of the wireless remote transmitter 12 is pushed for a period of twenty minutes, the circuits of the wireless remote transmitter 12 will be turned off to thereby conserve the power of the internal battery 134.

Figures 8A, 8B, 8C:
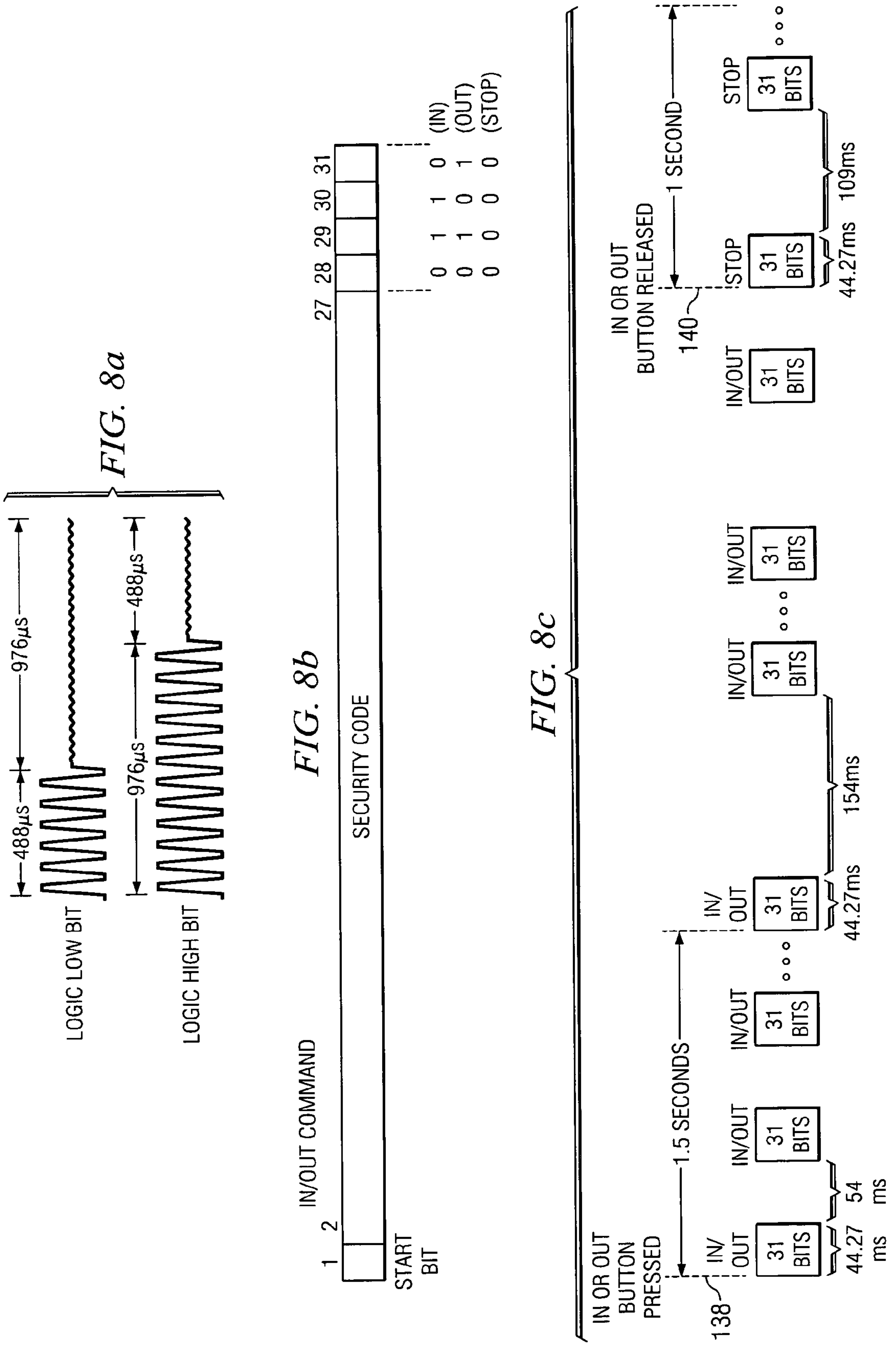
FIG. 8*a* illustrates the transmission of a digital one and a digital zero in accordance with the invention.
FIG. 8*b* illustrates the transmission commands for the In, Out and Stop codes.
FIG. 8*c* illustrates the sequence of command transmissions from the wireless transmitter according to one embodiment of the invention.

FIGS. 8*a*–8*d* illustrate the various transmission signals, formats, etc., which can be produced by the wireless transmitter 12. As noted above, the circuits of the wireless remote transmitter 12 can be activated or otherwise powered up by pressing the On/Off switch 38 until the LED 40 blinks once, indicating the wireless remote control 12 is ready to transmit. In order to wind the cable on the winch reel, the In switch 42 is pressed and held down. When the In button 42 has been depressed, an initial start bit is transmitted. The start bit is followed by thirty bits, all of which are modulated on the 434.00 MHz carrier frequency. A PWM coding technique that can be employed is one where a logic low is encoded for a time period of ⅓ on and ⅔ off, and a logic high is encoded for a time period of ⅔ on and ⅓ off. This is shown in FIG. 8*a*, where for a logic low bit, the carrier frequency is on for about 488 microseconds and off for about 976 microseconds. Conversely, for a logic high bit, the carrier frequency is turned on for a period of about 976 microseconds and turned off for a period of about 488 microseconds. The AM/PWM pulses represent a carrier with a full amplitude, and the spaces between the PWM pulses represent a carrier that has a very small amplitude. In practice, the start bit is not a digital signal, but rather is a burst of the carrier frequency that lasts for about 0.36 ms. The start bit functions to activate the decoder portion of the receiver 18.

Those skilled in the art may prefer to utilize a somewhat different AM/PWM technique, by reversing the order of the AM portion of the digital bits. In other words, the 976 microsecond period for a digital low bit may precede the 488 microsecond portion of the carrier frequency. Similarly, for a logic high bit, the 488 microsecond period may precede the 976 microsecond period of the carrier frequency. In this latter technique, the start bit is more easily distinguished from the first bit of the security code.

The digital format for the In, Out and Stop commands shown in FIG. 8*b* are encoded on the carrier using thirty-one bits according to the format: a first start bit; then twenty-six bits defining the security ID code; and lastly four bits which define either the In, Out and Stop command. As noted above, the start bit is not a typical digital bit that corresponds to the timing constraints of FIG. 8*a*., but is a single burst of the carrier frequency. The In command is transmitted when bits twenty-eight through thirty-one are the combination 0110. When bits twenty-eight through thirty-one constitute the logic combination of 0101, the Out command is transmitted. A Stop command is automatically transmitted when the In or Out button 42 and 44 are released. The Stop command has the format of: an initial start bit; then twenty-six bits which define the security ID code; and the last four bits of 0000 which uniquely define the Stop command. The microprocessor 130 is programmed with a unique security code for each winch so that the chances of operating other wireless equipment is extremely remote. Once the security code is transmitted, the In, Out or Stop code is transmitted on the carrier. The transmission of the start code, the security ID code and the four-bit command code takes about 44.27 ms.

The transmission sequence of the various commands according to one embodiment is shown in FIG. 8*c*. The In button 42 or the Out button 44 of the wireless remote transmitter 12 is assumed to have been pressed at the time shown by broken line 138. Irrespective of how long the In button 42 or the Out button 44 is depressed, the wireless remote transmitter 12 will transmit the respective In command or Out command for about a 45 ms period of time, and then will interrupt transmission of the In command (or Out command) for about 54 ms. This same sequence repeatedly occurs for the first 1.5 seconds after the In button 42 (Out button 44) has been depressed. After 1.5 seconds, the In or Out command is transmitted again for 45 ms, and then is not transmitted for about 154 ms. This second sequence continues for the remainder of the time in which the In button 42 (Out button 44) is depressed. The reduced number of transmissions of the format conserves battery power.

When the In button 42 (or Out button) is released by the operator, as shown by broken line 140, the coded commands for winding or unwinding the cable stops. Importantly, upon release of either the In button 42 or the Out button 44, the wireless remote transmitter 12 automatically transmits the Stop command. The Stop command is transmitted for a time period of about 1.5 second after the In button 42 or Out button 44 has been released. A series of Stop commands, each separated by about a 109 ms period, is transmitted for the 1.5 second time period. As will be described more fully below in connection with the wireless receiver 18, if no valid command is received by the receiver 18 within a two-second period of time, the winch motor 27 will stop.

As noted above, the In command causes the winch motor 27 to turn in one direction. When the Out switch 44 is depressed, the winch motor 27 is caused to turn in an opposite direction. The operation of the microprocessor 130 works in a similar manner when the Out button 44 is depressed, except an Out command, rather than an In command is transmitted by the wireless remote transmitter 12. The microprocessor 130 is also programmed to sense when the unit has been placed in the power on mode, but if neither the In button 42 or the Out button 44 have not been activated for a predefined period of time, the wireless remote transmitter 12 will be turned off.

Figure 8D:
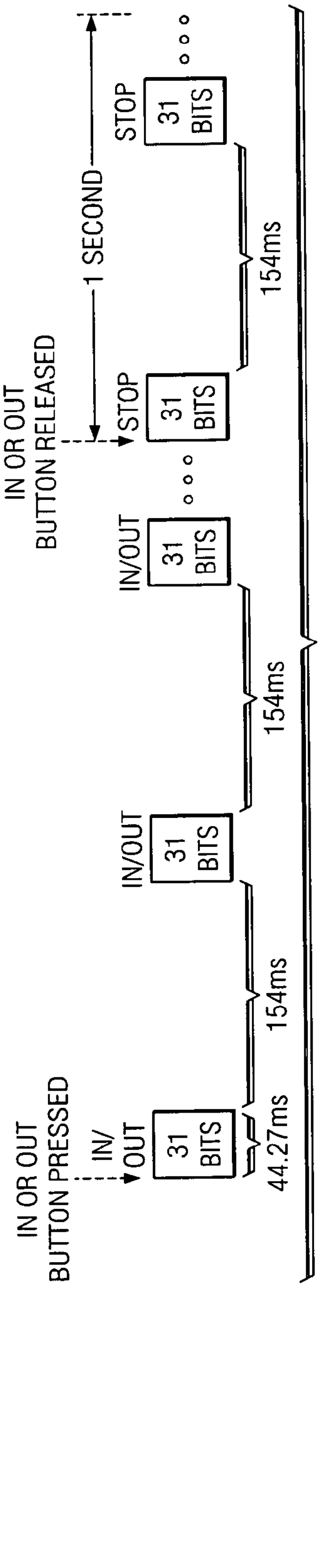
FIG. 8*d* illustrates a transmission sequence according to another embodiment of the invention.

FIG. 8*d* depicts a transmission sequence of the commands according to another embodiment of the invention. Here, the In or Out command is transmitted when the respective In or Out button 42 or 44 is depressed. Thereafter, a silent period of 154 ms occurs. This sequence is repeated until the In or Out button is released, whereupon the Stop command is transmitted at 154 ms intervals for a remaining period of about 1.5 second.

Figure 9:
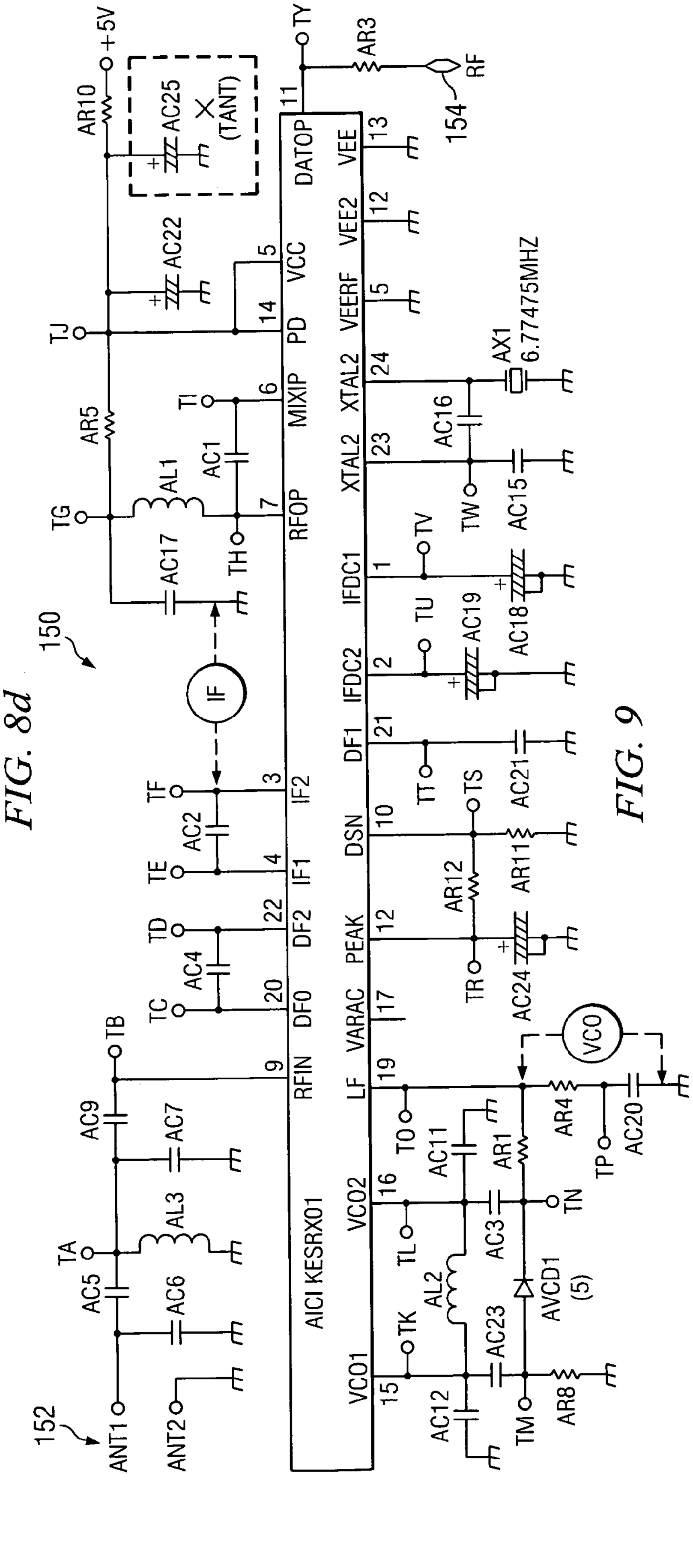
FIG. 9 is an electrical schematic diagram of an rf receiver and demodulator portion of the receiver.

With reference now to FIG. 9, there is illustrated the 434 MHz superheterodyne receiver which comprises part of the AM receiver 18 shown in FIG. 1. The rf portion 150 of the receiver 18 operates with an integrated circuit identified as type KESRX01. The AM antenna 20 shown in FIG. 6 includes the coax 48 coupled to the receiver antenna input 152. The integrated circuit 150 and support circuits demodulate the transmitted PWM coded signals and provide a digital signal train on output 154, much like the digital codes modulated on the carrier by the wireless remote transmitter 12. As such, the security ID code, In command, the Out command and the Stop command are demodulated from the transmitted AM signal and provided at the rf receiver output 154.

Figure 10:
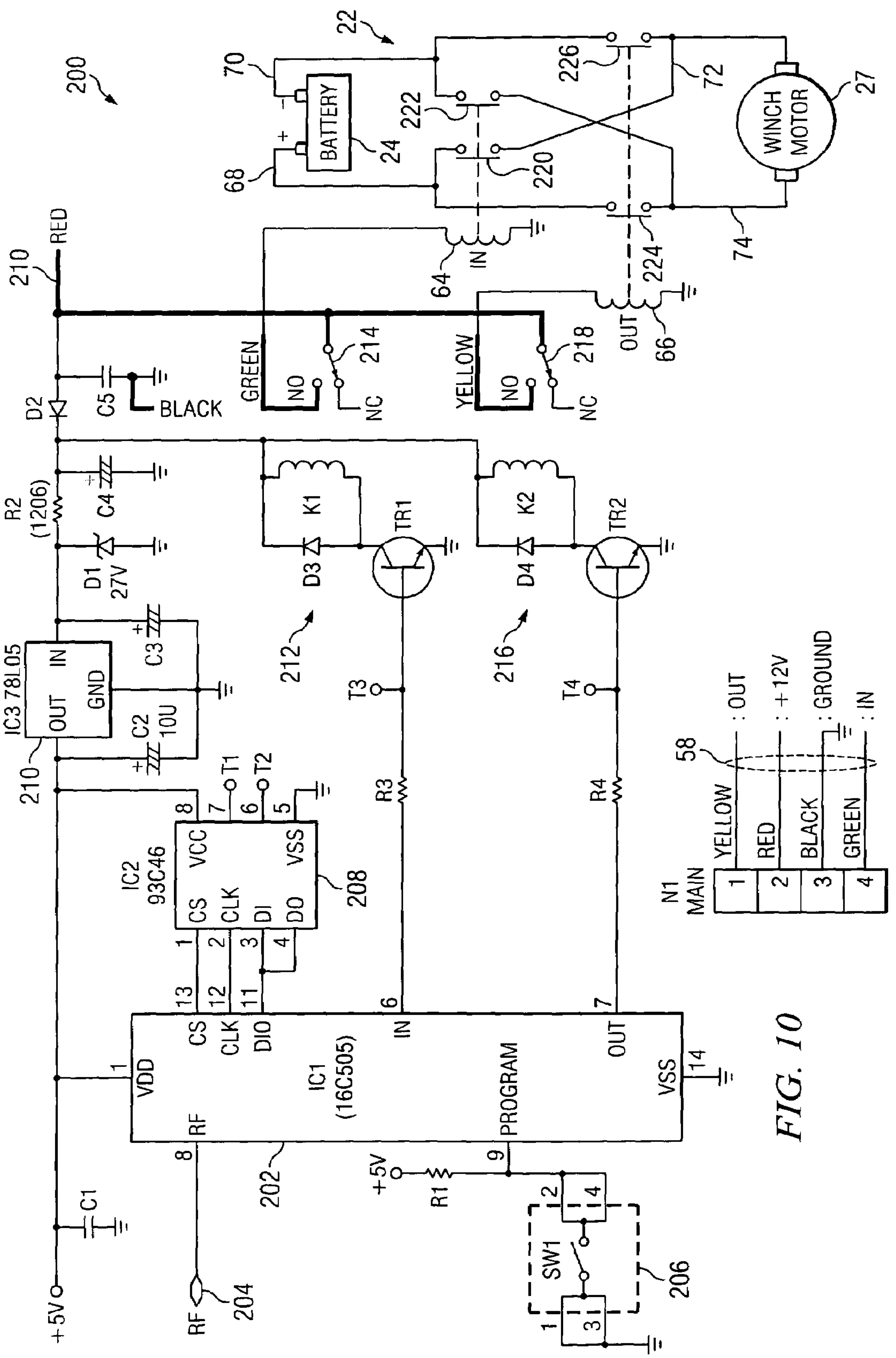
FIG. 10 is an electrical schematic diagram of the control portion of the receiver.

FIG. 10 illustrates the control portion 200 of the wireless receiver 18. The control portion 200 includes a microprocessor 202 having an rf input 204 coupled to the output 154 of the rf section 150 of the receiver 18. The demodulated train of digital signals is input to the microprocessor 202 via this input. The microprocessor 202 is programmed to verify the security ID code received with the security ID code programmed therein. In addition, the microprocessor 202 is programmed to detect the existence of the In, Out and Stop commands and carry out the respective functions. A switch 206 is operable for allowing the microprocessor 202 to be programmed with the security code. The microprocessor 202 is driven by a clock circuit 208. A voltage regulator 210 is employed to ensure that the power output by the receiver to the solenoid module 22 (FIG. 1) is twelve volts. The control portion 200 of the AM receiver 18 includes a terminal 210 providing the twelve volts output power. The microprocessor 202 drives a first relay driver 212 for closing a heavy-duty set of contacts 214. The contacts 214, when closed, cause the battery 24 to operate through the solenoid module 22 to cause the winch motor 27 to turn in a certain direction so as to wind the cable on the reel 32. The microprocessor 202 also drives a second relay driver 216 which operates a second pair of heavy-duty contacts 218. When closed, the second pair of contacts 218 controls the solenoid control 22 to cause the motor 27 of the winch 26 to rotate in the opposite direction to thereby allow the cable to be played out of the reel of the winch 26.

The heavy duty contacts 214 and 218 are effectively coupled to the control windings of the solenoids 64 and 66 shown in FIGS. 4 and 9. As can be seen from FIG. 9, the solenoid 64 has dual contacts 220 and 222. In like manner, the solenoid 66 has dual contacts 224 and 226. The solenoid contacts 220 and 222 operate when the winding of solenoid 64 is energized. Similarly, both contacts 224 and 226 operate together when the winding of solenoid 66 is energized. The solenoid contacts are arranged and connected to the terminals of the battery 24 so as to provide current flow in one direction through the winch motor when solenoid 64 is activated, and provide current flow in an opposite direction when solenoid 66 is operated. It can be appreciated that both solenoids 64 and 66 are not operated at the same time.

From the foregoing, a wireless remote control for a winch has been disclosed which provides reliable operation. The AM/PWM modulation technique by which information is transmitted from the wireless remote transmitter 12 to the receiver 18 allows the system to be commercialized in a very cost effective and reliable manner.

While the wireless remote control is described as operating in conjunction with an ATV, the invention can be utilized in winches in other types of vehicles, winches used in fixed industrial applications, in other commercial or industrial motor control systems, and lastly in any other type of system in which remote wireless control can be used.

While a preferred and other embodiments of the invention have been disclosed as referenced to specific apparatus, equipment and circuits, and method of operation thereof, it is to be understood that many changes in detail may be made as a matter of engineering choices, without departing from the spirit and scope of the invention, as defined by the appended claims.

What is claimed is:

1. A wireless control system for remotely controlling a winch, comprising:

a hand-held wireless remote control having switches providing at least three manual inputs;

a transmitter in said wireless remote control, said transmitter responsive to an input thereto for transmitting a carrier frequency;

a programmed processor, programmed for modulating the carrier frequency to produce a frame of bits;

said frame of bits including an ID field for identifying a particular winch to be controlled, and a control field for identifying a control to be exerted on the winch;

one said switch responsive to a manual input for providing winch In signals only for as long as manually activated;

one said switch responsive to a manual input for providing winch Out signals only for as long as manually activated;

one said switch responsive to a manual input for providing On/Off signals;

said programmed processor for modulating said transmitter in response to the manual inputs of said switches, said processor programmed to respond to said In signals and said Out signals for placing corresponding bits in said control field of said frame of bits;

said programmed processor adapted for receiving an Off signal manually input by a user of the wireless remote control and responsive thereto for placing said processor into a sleep mode to thereby conserving power; and said programmed processor responsive to a release of the either of the switches producing the respective In signals and the Out signals for automatically generating a signal for use in stopping the winch, said programmed processor programmed for modulating said carrier with the signal for stopping the winch.

2. The wireless control system of claim 1, further including in combination a wireless receiver and antenna adapted for mounting to a vehicle, and wherein said winch is adapted for mounting to a vehicle.

3. The wireless control system of claim 1, wherein said transmitter is constructed to transmit the frame of bits during a period of transmission, and wherein said Out, In and stop signals occupy the same bit positions of said control field.

4. The wireless control system of claim 1, further including a circuit for storing a multi-bit security code, and a circuit responsive to an input to said transmitter of the Out signal and the In signal for transmitting said security code together with one of said Out signal and said In signal.

5. The wireless control system of claim 1, further including a single on/off press-type switch for activating and deactivating the wireless control system, and further including a visual indicator for indicating an activated or deactivated status of the wireless control system.

6. The wireless control system of claim 5, further including a circuit for blinking the visual indicator in a distinctive manner to visually indicate the status of the wireless control system.

7. The wireless control system of claim 5, further including a timer for timing a period of time in which the on/off switch has been pressed before activating and deactivating the wireless control system.

8. The wireless control system of claim 1, wherein one said switch comprises a press-type of Out switch, one said switch comprises a press-type of In switch and one said switch comprises a press-type on/off switch, said Out press-type switch associated with circuits for causing a cable of the winch to unwind in an out direction, said In press-type switch associated with circuits for causing the equipment cable of the winch to wind in a an in direction, and said on/off switch associated with circuits for applying power and reducing power consumption in the wireless control system.

9. The wireless control system of claim 1, wherein said circuits associated with said Out and IN switches are responsive to a single release of said Out or IN switch for transmitting said stop signal multiple times.

10. The wireless control system of claim 1, further including in combination a receiver mounted to equipment to which said winch is mounted, said receiver including an antenna for receiving signals transmitted from said transmitter, said antenna including a conductive foil strip adhered to an insulator, said conductive foil strip being configured as a dipole antenna.

11. A wireless remote control for use with a winch mounted on a vehicle, comprising:

a wireless receiver mounted to the vehicle;

a wireless hand-held transmitter for transmitting a coded signal to the receiver, said wireless transmitter having a forward switch, a reverse switch and a power switch for controlling power to the transmitter;

said wireless transmitter provided with a transmission format for the coded signal, said transmission format including a field for a security code, and a field for a control code used for controlling operation of the winch, said wireless transmitter modulating a carrier frequency by modulating the security code and the control code thereon;

said control code including a forward code, a reverse code and a stop code;

said transmitter including a programmed processor responsive to activation and deactivation of said forward switch, and responsive to activation and deactivation of said reverse switch, for causing modulation of said carrier frequency, said processor programmed to modulate said carrier frequency with said forward code when said forward switch is activated, said processor programmed to modulate said carrier frequency with said reverse code when said reverse switch is activated, and said processor programmed to modulate said carrier frequency with said stop code when either said forward switch or said reverse switch is deactivated;

a horizontally polarized dipole antenna mounted to the vehicle;

said wireless receiver coupled to said antenna, and said receiver including demodulation circuits for demodulating said control codes and controlling operation of said winch; and a solenoid arrangement coupled between a battery of the vehicle and the winch, said receiver including a driver circuit for driving the solenoid arrangement in response to the control signals demodulated from the carrier frequency, said solenoid arrangement driven in response to a demodulated forward code for driving current through a motor of said winch to wind a cable on a reel in a forward direction, and said solenoid arrangement driven in response to a demodulated reverse code for driving current through the motor to unwind the cable from the reel, and said solenoid arrangement disconnecting the winch motor from the battery in response to a demodulated stop code.

12. The wireless remote control of claim 11, further including in combination an ATV, and wherein said antenna is mounted to a plastic portion of the ATV.

13. The wireless remote control of claim 12, wherein said antenna comprises a conductive foil antenna mounted horizontally on an undersurface of a plastic headlight housing.

14. The wireless remote control of claim 13, wherein said antenna is mounted to the undersurface of the headlight housing with an adhesive.

15. A wireless control for use with a winch mounted on a vehicle, comprising:

a winch having a DC motor operated by a vehicle battery, said winch having a drum rotatable in a first direction by a DC current flowing in said DC motor in one direction to wind a cable on said drum, and said drum rotatable in a second direction by DC current flowing in said DC motor in an opposite direction to unwind the cable from said drum;

a solenoid arrangement responsive to a signal for switching a direction of the DC current from the vehicle battery to the DC motor of the winch to control whether the cable is wound or unwound on the drum;

a wireless remote control having a first button which when depressed causes a first signal to be transmitted as long as said first button is depressed, and a second button which when depressed causes a second signal to be transmitted as long as said second button is depressed, said first and second buttons of said wireless remote control being effective to control the winding and the unwinding of the cable on the drum of the winch;

a wireless receiver mounted to the vehicle, said wireless receiver adapted for receiving the first and second signals transmitted by said wireless remote control, said wireless receiver having an electrical cable coupling control signals to said solenoid arrangement; and an antenna having a base member from which a first antenna element and a second antenna element extends, said base member adapted for mounting to the vehicle, said first and second elements extending in opposite directions.

16. The wireless control of claim 15, wherein said electrical cable connecting said wireless receiver to said solenoid arrangement includes a connector for connecting an end of said wireless receiver cable to said solenoid arrangement.

17. The wireless control of claim 15, wherein said antenna elements each comprise adhesive-backed metallic foil.

18. The wireless control of claim 15, wherein said base member of said antenna is adhesive-backed for mounting to a surface of the vehicle.

19. The wireless control of claim 15, wherein said wireless remote control further includes a button which, when depressed, removes electrical power from circuits housed by said wireless remote control.

20. The wireless control of claim 15, wherein said solenoid arrangement includes a pair of electrically-operated solenoids, and wherein said wireless receiver further includes a pair of relay contacts for switchably controlling said pair of electrically-operated solenoids.

21. The wireless control of claim 15, wherein said antenna is remotely located from said wireless receiver on the vehicle, and including an electrical cable for connecting said antenna to said wireless receiver.

* * * * *